(12) United States Patent
Coombs

(10) Patent No.: US 9,540,068 B2
(45) Date of Patent: Jan. 10, 2017

(54) ADJUSTABLE BICYCLE QUICK RELEASE FOR A SOLID AXLE

(75) Inventor: Michael D. Coombs, Heber City, UT (US)

(73) Assignee: Coombs Cycling Technologies LLC, Heber City, UT (US)

( * ) Notice: Subject to any disclaimer, the term of this patent is extended or adjusted under 35 U.S.C. 154(b) by 862 days.

(21) Appl. No.: 12/984,529

(22) Filed: Jan. 4, 2011

(65) Prior Publication Data

US 2012/0007332 A1    Jan. 12, 2012

Related U.S. Application Data

(60) Provisional application No. 61/385,534, filed on Sep. 22, 2010, provisional application No. 61/292,100, filed on Jan. 4, 2010.

(51) Int. Cl.
*B62K 25/02* (2006.01)
*F16B 2/18* (2006.01)

(52) U.S. Cl.
CPC ........... *B62K 25/02* (2013.01); *B62K 2206/00* (2013.01); *F16B 2/185* (2013.01); *Y10T 29/49826* (2015.01)

(58) Field of Classification Search
USPC ..................................... 280/281.1; 301/124.2
See application file for complete search history.

(56) References Cited

U.S. PATENT DOCUMENTS

| | | | |
|---|---|---|---|
| 4,033,627 A | 7/1977 | Morroni | |
| 4,400,038 A * | 8/1983 | Hosokawa | B60B 27/023 280/288 |
| 4,440,414 A | 4/1984 | Wang | |
| 4,906,053 A | 3/1990 | Kawai | |
| 5,215,324 A | 6/1993 | Kawai | |
| 5,249,879 A | 10/1993 | Zoor | |
| 5,257,855 A | 11/1993 | Nagano | |
| 5,271,633 A | 12/1993 | Hill, Jr. | |
| 5,312,166 A | 5/1994 | Nagano | |
| 5,383,716 A * | 1/1995 | Stewart | B60B 27/023 301/110.5 |
| 5,447,362 A * | 9/1995 | Nagano | B60B 27/023 301/110.5 |
| 5,626,401 A | 5/1997 | Terry, Sr. et al. | |
| 5,727,850 A | 3/1998 | Masclet | |
| 6,004,064 A * | 12/1999 | Franz | B62K 25/02 301/124.2 |
| 6,132,006 A | 10/2000 | Post | |
| 6,173,975 B1 | 1/2001 | Brandner | |
| 7,562,942 B2 | 7/2009 | D'Aluisio | |
| 7,628,416 B2 * | 12/2009 | Hara | B62K 25/02 280/260 |

(Continued)

OTHER PUBLICATIONS

Brown, "Sehldon Brown on Quick Release Skewers," Harris Cyclery, printed from www.sheldonbrown.com/skewers.html on Dec. 11, 2009, copyright 2005,2008.

*Primary Examiner* — Joseph Rocca
*Assistant Examiner* — Felicia L Brittman
(74) *Attorney, Agent, or Firm* — Terrence J. Edwards; TechLaw Ventures, PLLC

(57) ABSTRACT

An adjustable quick release system and mechanism for use with a bicycle frame, a unicycle frame or other frame is disclosed. An embodiment of an adjustable quick release mechanism may comprise a housing, a spacer, a tubular nut, a cam system, and a lever.

29 Claims, 19 Drawing Sheets

(56) References Cited

U.S. PATENT DOCUMENTS

| | | | |
|---|---|---|---|
| 2003/0089146 A1 | 5/2003 | Denby | |
| 2007/0154286 A1* | 7/2007 | Spahr | B62K 25/02 411/402 |
| 2008/0211296 A1* | 9/2008 | Takachi | B62K 25/02 301/124.2 |
| 2008/0246332 A1* | 10/2008 | Winefordner et al. | 301/124.2 |
| 2009/0102276 A1 | 4/2009 | Mercat et al. | |
| 2009/0261648 A1 | 10/2009 | Cusack | |
| 2012/0321373 A1* | 12/2012 | Chang | B62K 25/02 403/106 |

\* cited by examiner

ADJUSTABLE BICYCLE QUICK RELEASE FOR A SOLID AXLE

CROSS-REFERENCE TO RELATED APPLICATIONS

This application claims the benefit of U.S. Provisional Application No. 61/385,534, filed Sep. 22, 2010, entitled "Adjustable Bicycle Quick Release For A Solid Axle," and U.S. Provisional Application No. 61/292,100, filed Jan. 4, 2010, entitled "Bicycle Quick Release For A Solid Axle," which are hereby incorporated by reference herein in their entireties, including but not limited to those portions that specifically appear hereinafter, the incorporation by reference being made with the following exception: In the event that any portion of the above-referenced applications is inconsistent with this application, this application supercedes said above-referenced applications.

STATEMENT REGARDING FEDERALLY SPONSORED RESEARCH OR DEVELOPMENT

Not Applicable.

BACKGROUND

The disclosure relates generally to bicycle quick release mechanisms for attaching and removing a wheel from the forks of a bicycle, unicycle or other frame, and more particularly, but not necessarily entirely, to a quick release mechanism used with wheels having solid axles and accommodating variable axle lengths.

The features and advantages of the disclosure will be set forth in the description which follows, and in part will be apparent from the description, or may be learned by the practice of the disclosure without undue experimentation. The features and advantages of the disclosure may be realized and obtained by means of the instruments and combinations described herein.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

Figure 1:
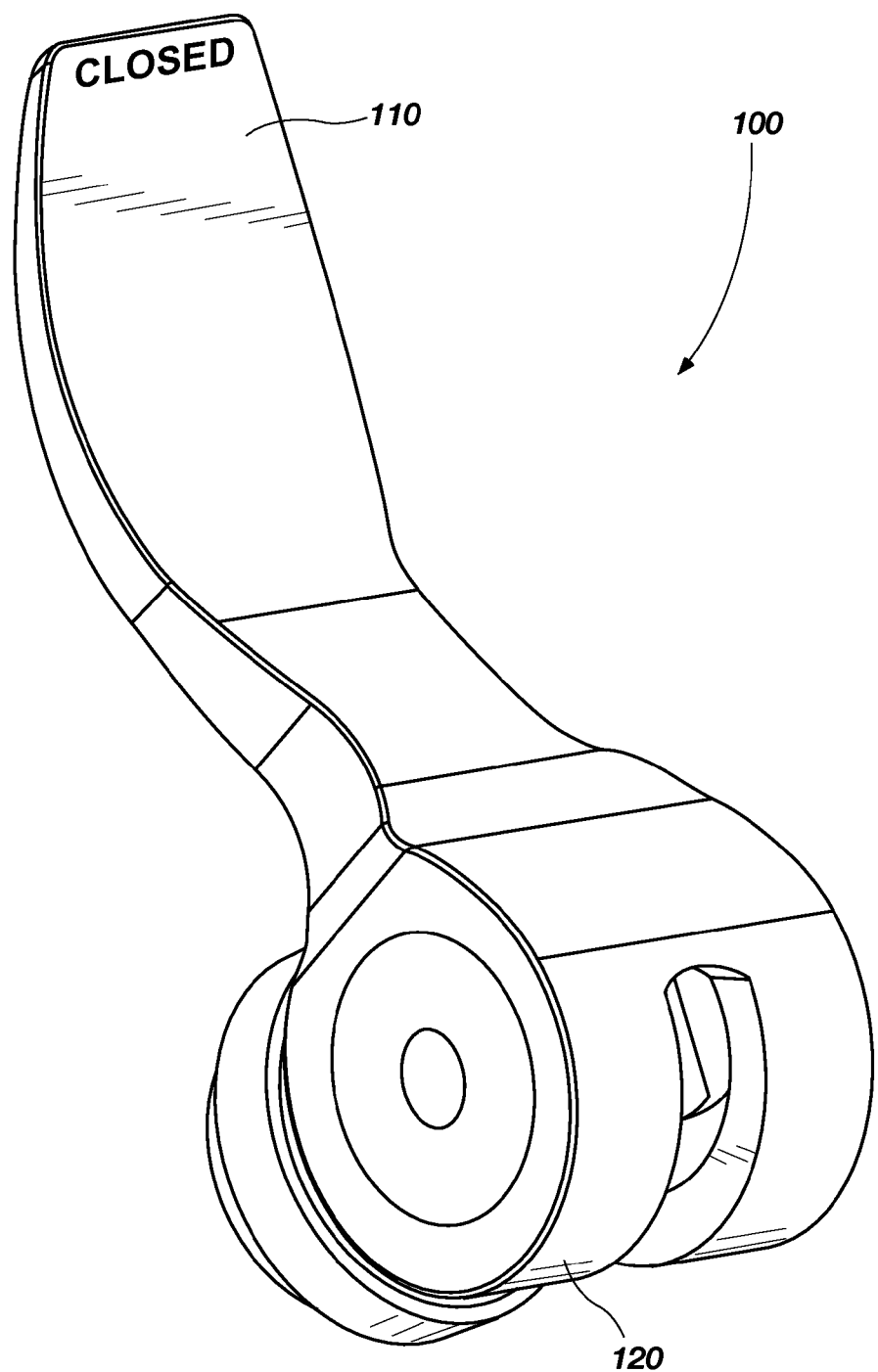
FIG. 1 illustrates an embodiment of a solid axle quick release mechanism and its components consistent with the disclosure herein.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure.

Before the various components of a bicycle or unicycle or other quick release used in conjunction with a solid axle are disclosed and described, it is to be understood that this disclosure is not limited to the particular configurations, process steps, and materials disclosed herein as such configurations, process steps, and materials may vary somewhat. It is also to be understood that the terminology employed herein is used for the purpose of describing particular embodiments only and is not intended to be limiting.

It must be noted that, as used in this specification and the appended claims, the singular forms "a," "an," and "the" include plural referents unless the context clearly dictates otherwise.

In describing and claiming the subject matter of the disclosure, the following terminology will be used in accordance with the definitions set out below.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element, step, or ingredient not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

As used herein, the term "proximal" shall refer broadly to the concept of a portion nearest the body or center.

As used herein, the term "distal" shall generally refer to the opposite of proximal, and thus to the concept of a portion farthest from the body or center.

In the bicycle or unicycle market today, one will find many types of axles, hubs, and tightening/securing mechanisms to hold a wheel/hub to the frame of a bicycle, unicycle or other frame. Of those, all fall into one of two categories, namely a solid axle and a hollow hub with removable skewer.

The first is the most common, and comprises a solid axle that is fixed in position in relation to horizontal movement about the axis of the hub. Solid axles are typically threaded and are attached to the frame of the bicycle or unicycle using corresponding threaded nuts. The solid axle is secured to the frame of the bicycle or unicycle by loosening or tightening the threaded nut using an appropriately sized wrench.

A quick release mechanism can eliminate a user's need to carry a wrench or other tools in the case of a flat tire, or adjustment of the wheel placement on the frame. A user can typically remove or replace a wheel in a matter of seconds in order to repair a flat tire or other maintenance activities.

Several problems may arise due to the design of the solid axle hub with a threaded axle, including: (1) the need for specific tools and tool sizes; (2) potential damage to the components of the bicycle or unicycle caused by use of incorrect tools or incorrect tool size, such as stripping the edges of the nut due to undetectable differences in the sizing of metric and non-metric wrench sizes; (3) limitations to individuals with disabilities or weakness in removing components, such as removing a stripped nut, which requires the use of a specialized vice-grip style wrench to dig its teeth into the damaged metal sides of the nut and requires a large amount of force to press the wrench's grips down far enough into their locked position, such that those with disabilities or weakness have difficulty removing this type of wheel; (4) potential for physical harm to a bicycle or unicycle user in a bicycle or unicycle crash where the tools may injure the rider; and (5) potential wheel/frame connection failure or potential failure of components, due to a failure to complete a physical check of the bicycle or unicycle, including the tightness of the nuts securing the wheel to the bicycle, unicycle or other frame, because of a lack of tools on hand at all times and because of the difficulty involved in tightening and loosening the nuts on a solid, threaded axle.

Typically in order to replace a hub having a solid, threaded axle system with a quick release system on a bicycle, the entire hub and cassette of the bicycle must be replaced or converted using a hollow hub with a traditional quick release mechanism with a skewer. This solution is relatively expensive with respect to the cost of the bicycle and may be about $150 or more per wheel to replace. Thus, it is not economically feasible to replace the hubs on a bicycle or unicyle that was purchased new for a similar or lesser amount. Thus, the following discloses a quick release mechanism that can function without a hollow hub and skewer system and that can allow the wheel to move from side to side. Further, the following discloses a quick release mechanism that can be attached to a diameter of a typical threaded solid axle, which is about ⅜", while the typical diameter of a known skewer is much smaller and is about ⅛", which results in a connection point of the quick release mechanism with respect to the solid axle to approximately quadruple in size and load. Further, the following disclosure addresses the issue where the average length of exposed threaded axle is only about ⅝", which is one of the reasons for preventing the use of an exposed cam system (since in that system, the cam is between the frame and the threaded nut/quick release mechanism).

The disclosure seeks to minimize or potentially eliminate the need to replace the entire solid threaded axle hub system in order to enjoy a quick release mechanism for such bicycles. The disclosure instead uses a novel enclosed cam quick release mechanism or exposed cam quick release mechanism both of which can be used with a solid threaded axle system as described more fully herein to minimize or potentially eliminate the need to replace the entire solid threaded axle hub.

FIG. 1 illustrates an embodiment of a quick release mechanism 100 for use with a solid axle. As can be seen in the embodiment there is a lever portion 110 or part that allows a user to operate the quick release mechanism 100. The lever portion 110 may be configured to rotate relative to a barrel nut 160 or tubular nut 150. The tubular nut 150 may be configured to receive an end of a solid axle. The quick release mechanism 100 may also be configured with a cam member 120 having a cam surface 130 for transferring force from the lever 110 into a binding force thereby holding a wheel of a vehicle in place. The tubular nut 150 or barrel nut 160, may comprise a relieved 152 portion for accommodating fitment with other components in an assembly.

Figure 2:
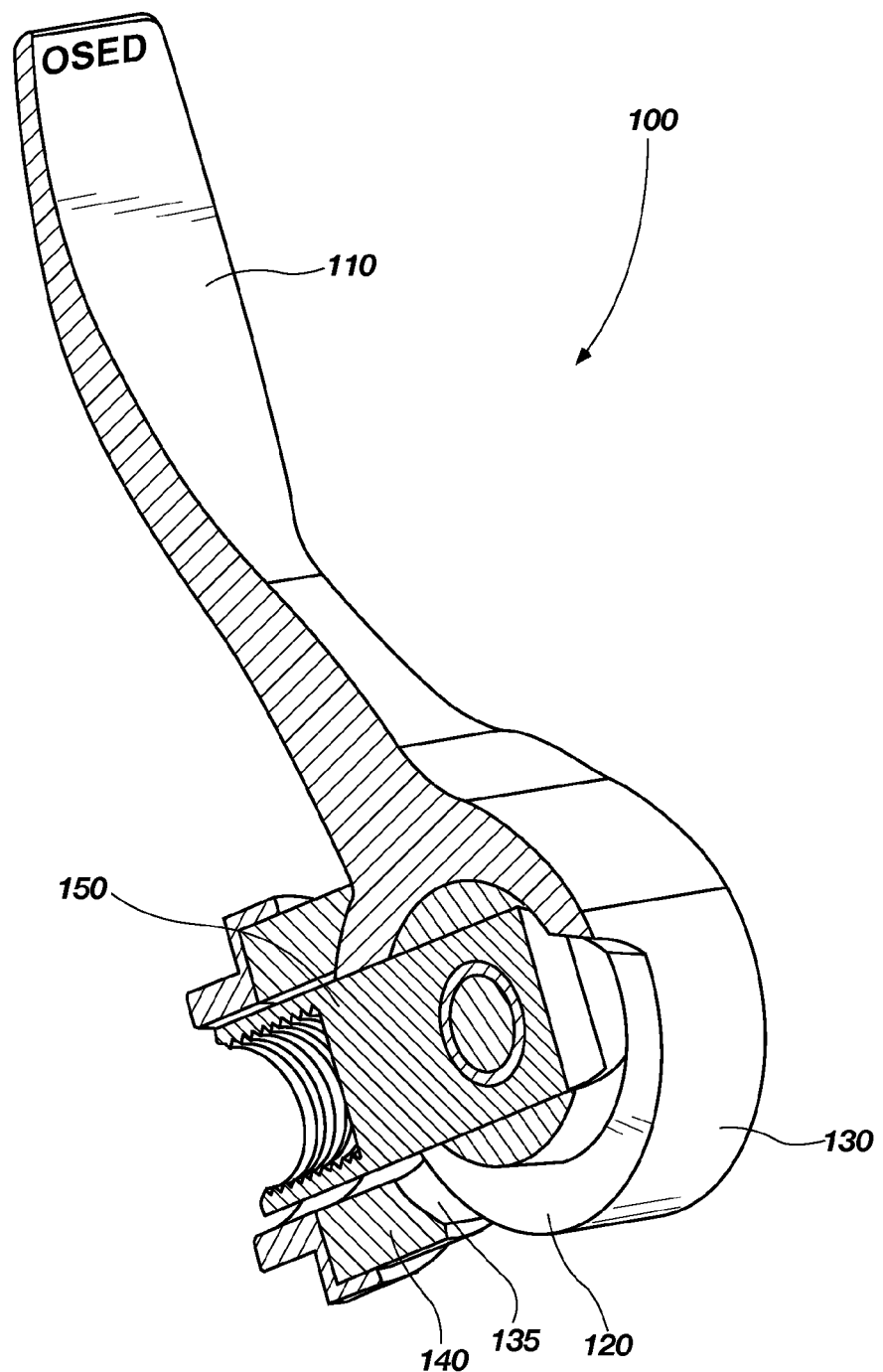
FIG. 2 illustrates an embodiment of a solid axle quick release mechanism and its components consistent with the disclosure herein.

FIG. 2 illustrates a cutaway view of an embodiment of a quick release mechanism 100 consistent with the disclosure herein. As can be seen in the figure, the cam member 120 of the lever 110 can act on a spacer 140 to transfer the force in the mechanism. The spacer 140 may be constructed of any suitable material. For example, the spacer 140 may be composed of plastic or may be made of a metal material. The spacer 140 may be configured of differing lengths allowing for the quick release mechanism 100 to accommodate various lengths of axles. The spacer 140 may be lengthened or shortened to determined the number of rotations the mechanism is threaded onto threads on the corresponding axle. By allowing for variable threaded conditions, the mechanism can be positioned to apply a predetermined amount of tension. For example, depending on the thread pitch, an increase of one millimeter in the length of the spacer 140 may equal a quarter of a turn of the quick release mechanism 100 on to the axle. The quick release mechanism 100 can then be positioned for the proper tension and lever position. For safety reasons, it may be desirable to have the lever 110 tuck in near the frame or fork, for example a bicycle frame or fork. In another embodiment, the spacer 140 may be lengthened or added to with the use of washers. The washers or spacers 140 may be configured to slide over the axle or receive the axle therein.

An embodiment may comprise a configuration wherein one millimeter of thread length equates to one complete 360 degree rotation. Accordingly, spacers 140 may be provided in increments of 0.25 millimeters thereby allowing for 90 degree rotational increments for the mechanism relative to the axle. It will be appreciated, however, that other increments may be used without departing from the scope of the disclosure. An embodiment of a system or kit may comprise a plurality of spacers 140 allowing for variable placement of the lever 110 of the quick release mechanism 100. An embodiment may comprise three additional incremental spacers 140 thereby allowing for a full 360 degree rotation of the mechanism.

Figure 3:
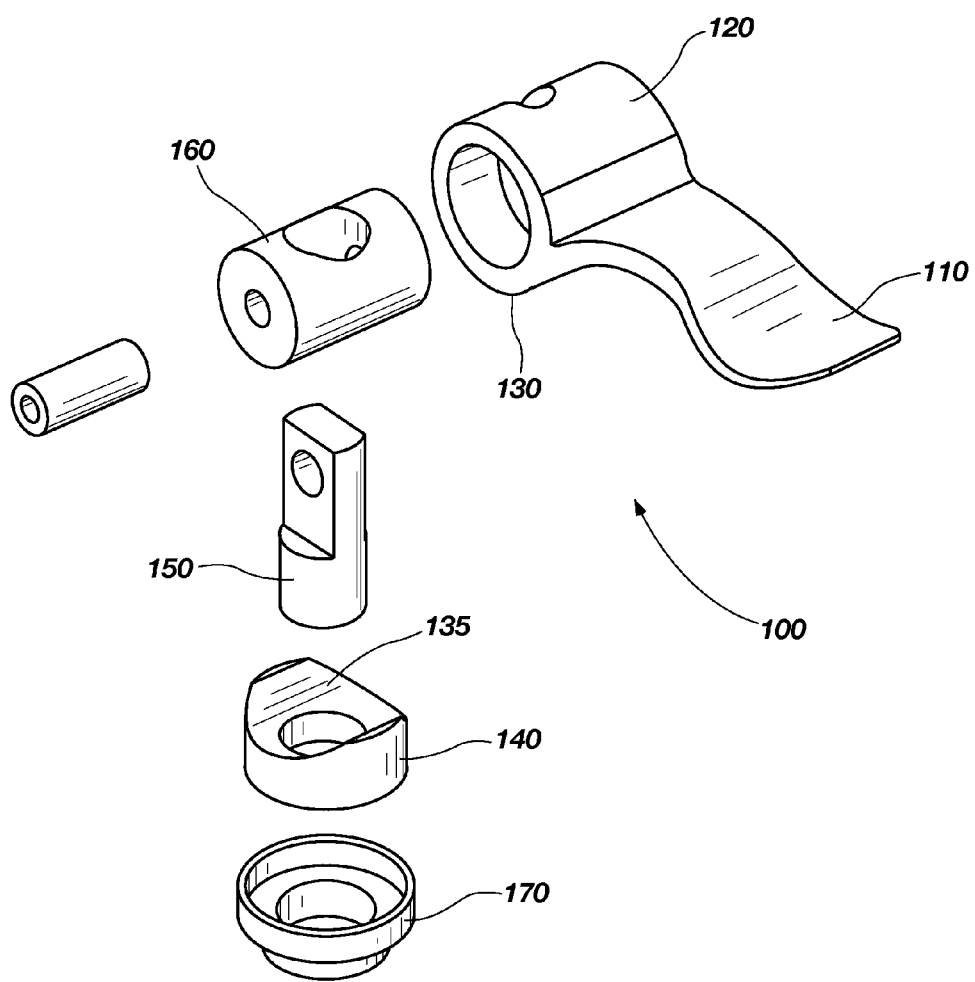
FIG. 3 illustrates an embodiment of a solid axle quick release mechanism and its components consistent with the disclosure herein.

Illustrated in FIG. 3 is an embodiment of a quick release mechanism 100 in an exploded view, showing the relative placement of the various components.

Figure 4:
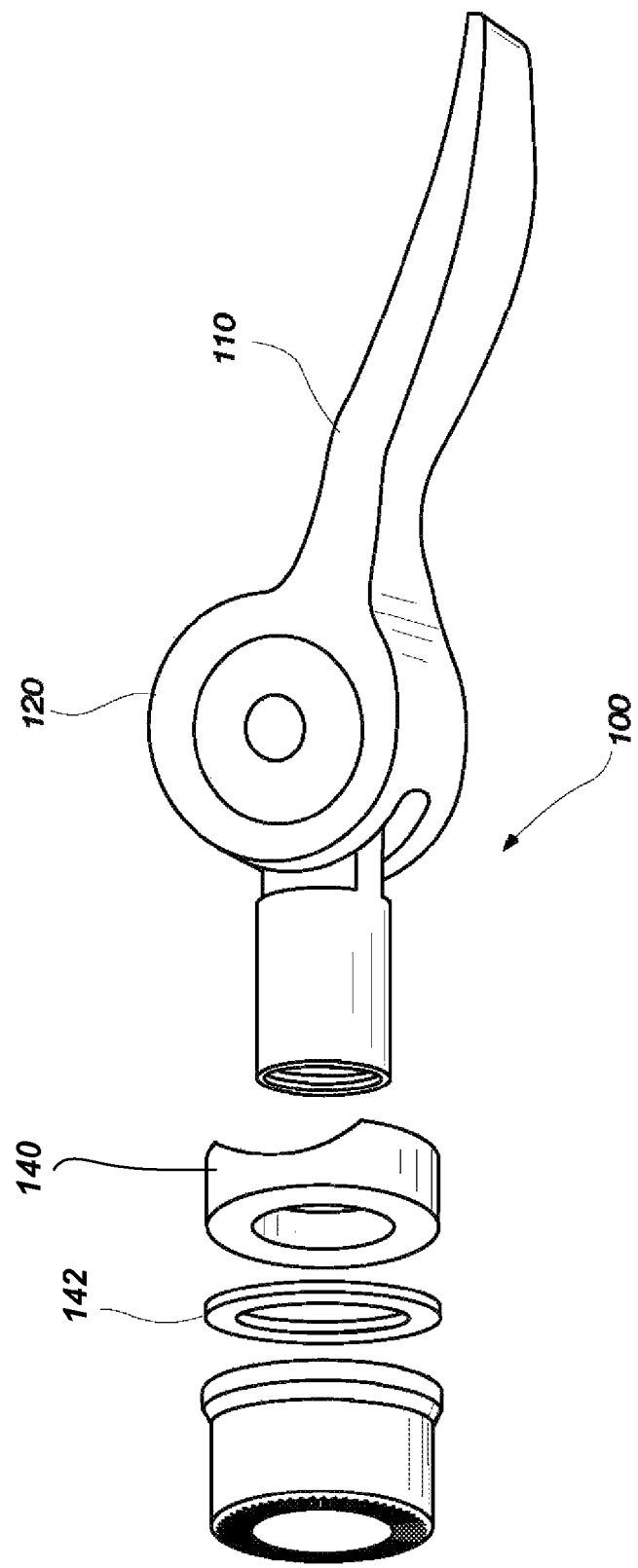
FIG. 4 illustrates an embodiment of a solid axle quick release mechanism and its components consistent with the disclosure herein.

Illustrated in FIG. 4 is an embodiment of a quick release mechanism 100 showing a spacer 140 and an incremental spacer 142 or washer. In an embodiment, the addition of the incremental spacer 142 may change the rotation of the mechanism on to the axle by 90 degrees. Other incremental configurations may be desirable by varying the thickness of the incremental spacer 142 or by using a plurality of incremental spacers 142, or by varying the thickness of the spacer 140.

Figure 5:
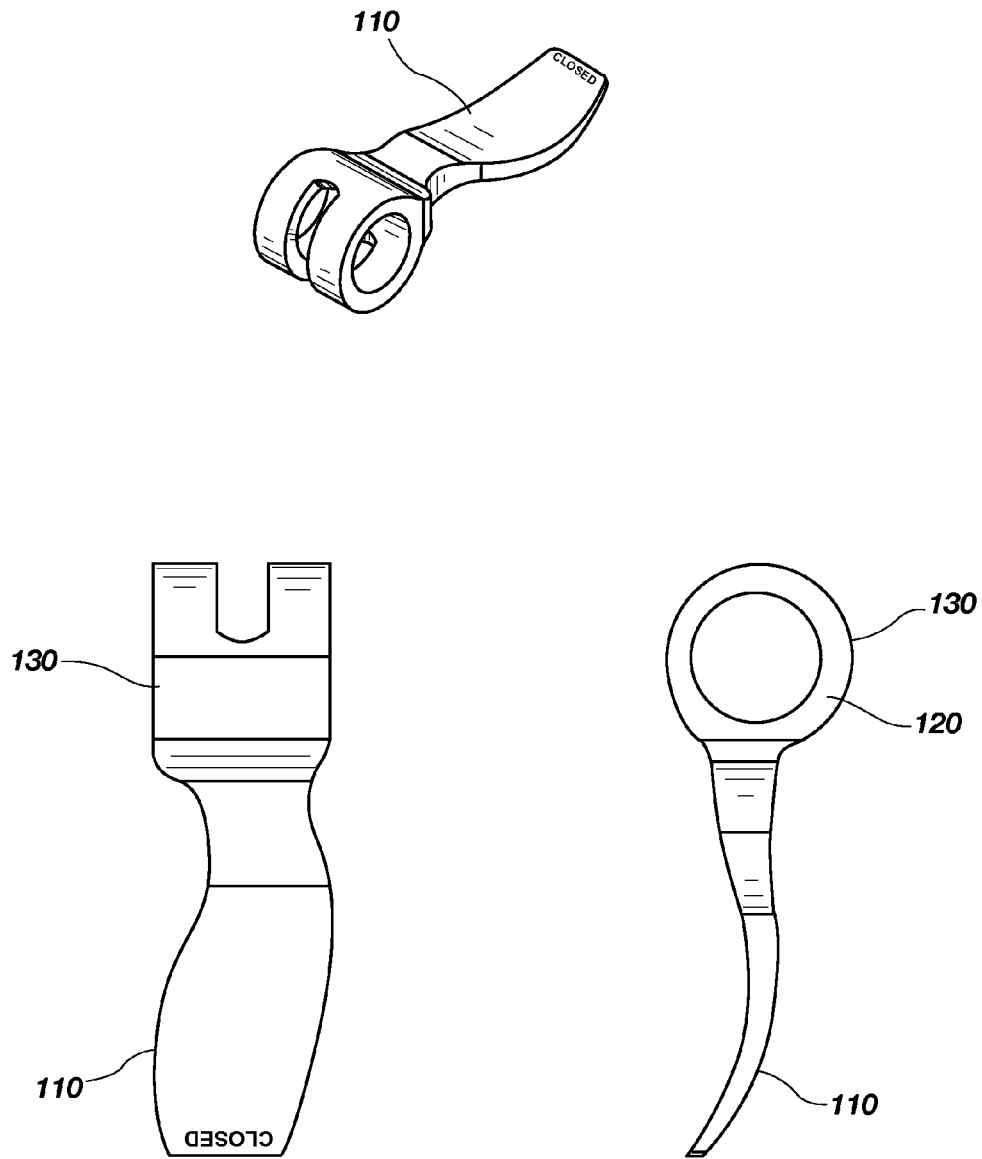
FIG. 5 illustrates an embodiment of a solid axle quick release mechanism and its components consistent with the disclosure herein.

FIG. 5 illustrates an embodiment of a lever 110 for use with a solid axle quick release. As can be seen in the figure, the lever 110 may be configured with a cam surface 130 such that rotation of the lever 110 about the cam surface 130 transfers force from the lever 110 to the axle for retention onto a frame, such as a bicycle or unicycle frame.

Figure 6:
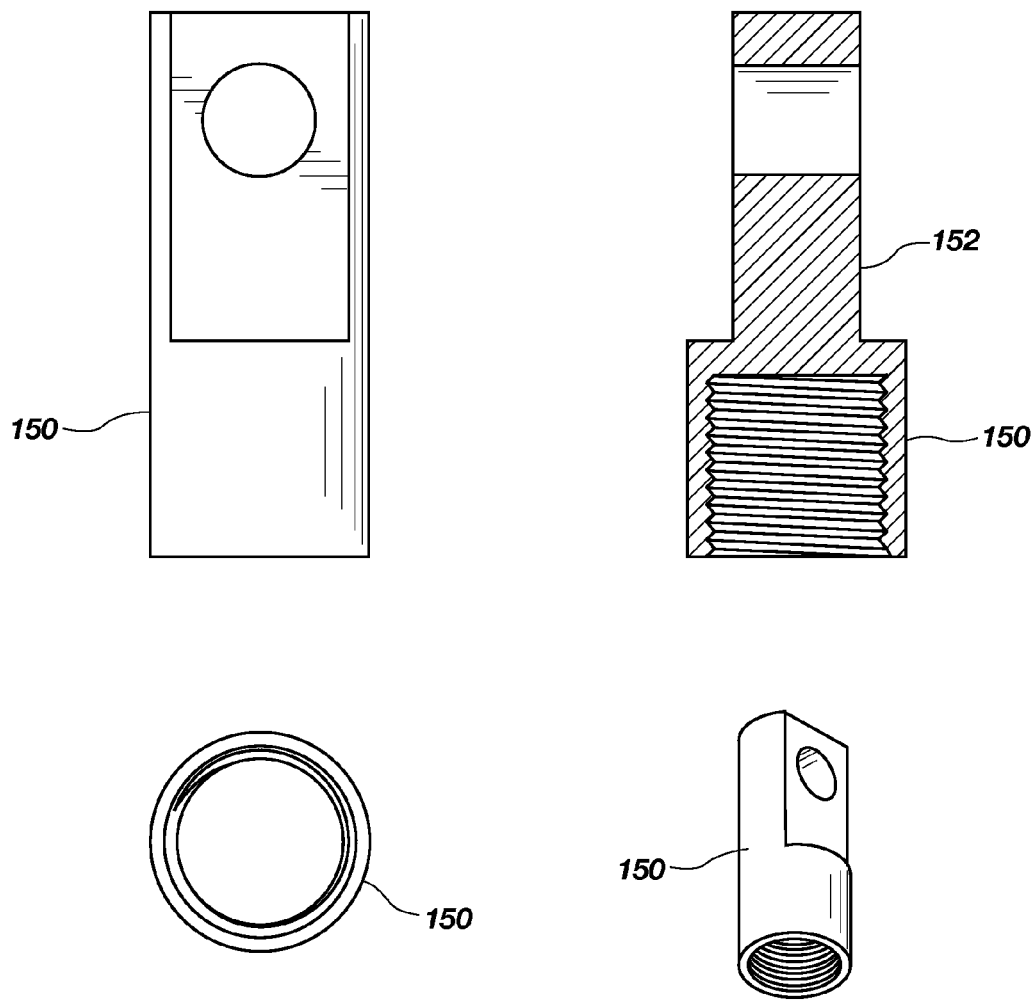
FIG. 6 illustrates an embodiment of a solid axle quick release mechanism and its components consistent with the disclosure herein.

FIG. 6 illustrates an embodiment of a tubular nut 150 configured for receiving a solid axle therein.

Figure 7:
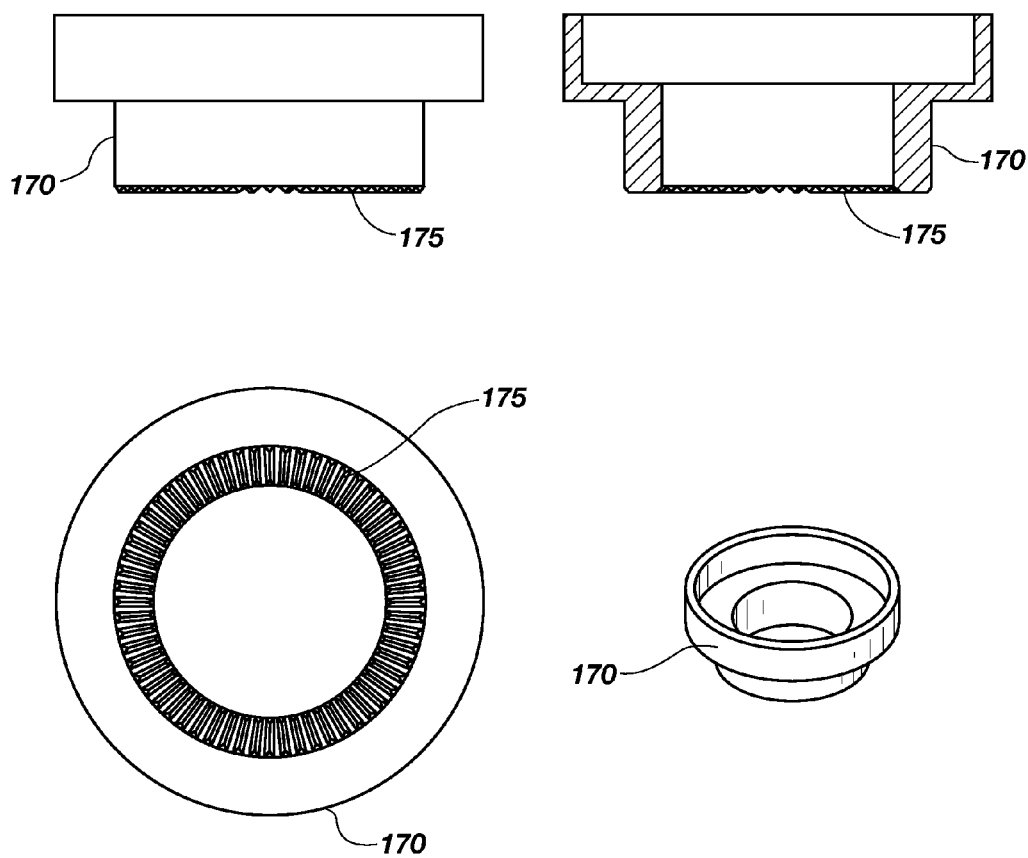
FIG. 7 illustrates an embodiment of a solid axle quick release mechanism and its components consistent with the disclosure herein.

FIG. 7 illustrates an embodiment of a transfer member 170 that may be configured for transferring a retaining force from a force applied at a lever 110 to the frame or fork of a bicycle, unicycle or other vehicle. The transfer member 170 may provide for the effective use of spacers 140 in the axle assembly. The transfer member 170 may comprise locking protrusions 175 for making a secure mechanical connection between the axle assembly and the frame or fork of a bicycle, unicycle or other vehicle. The transfer member 170 may provide the ability to use less complex spacers 140 while retaining the feature of locking structures.

Figure 8:
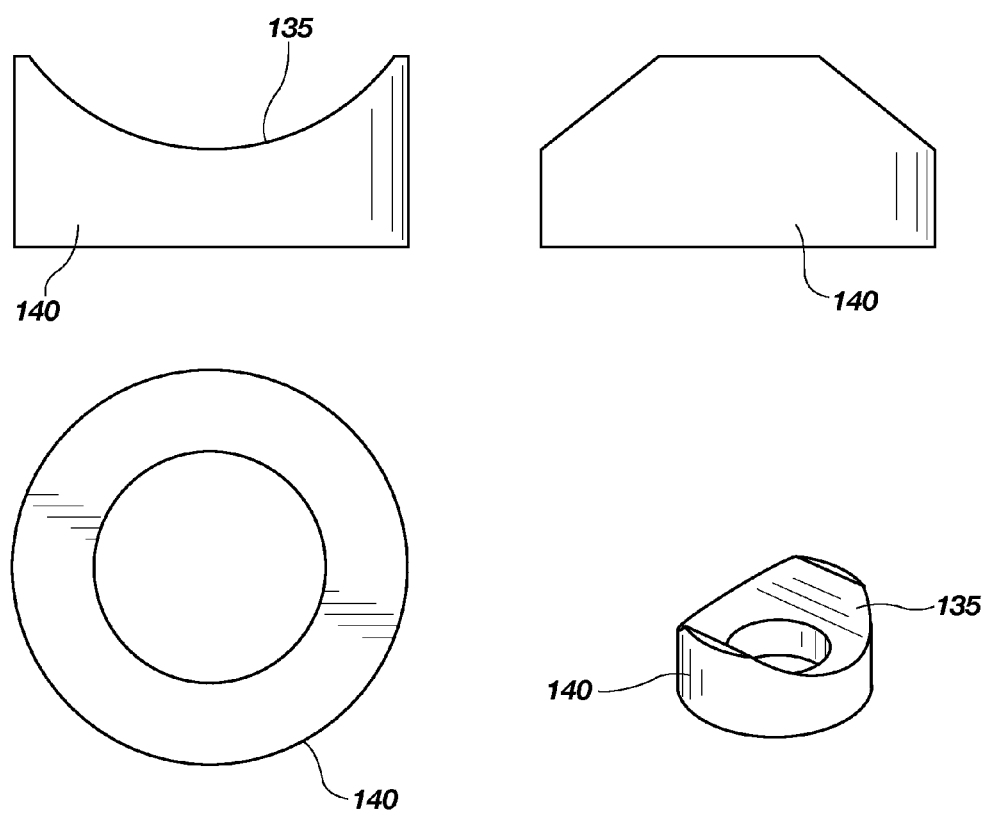
FIG. 8 illustrates an embodiment of a solid axle quick release mechanism and its components consistent with the disclosure herein.

FIG. 8 illustrates an embodiment of a spacer having a surface 135 for interfacing with a cam surface 130 on a lever 110. As discussed above, the spacer 140 may be made of any suitable material capable of withstanding compressive forces. As discussed above, the spacer 140 may have variable lengths for allowing for adjustability in the quick release mechanism 100.

Figure 9:
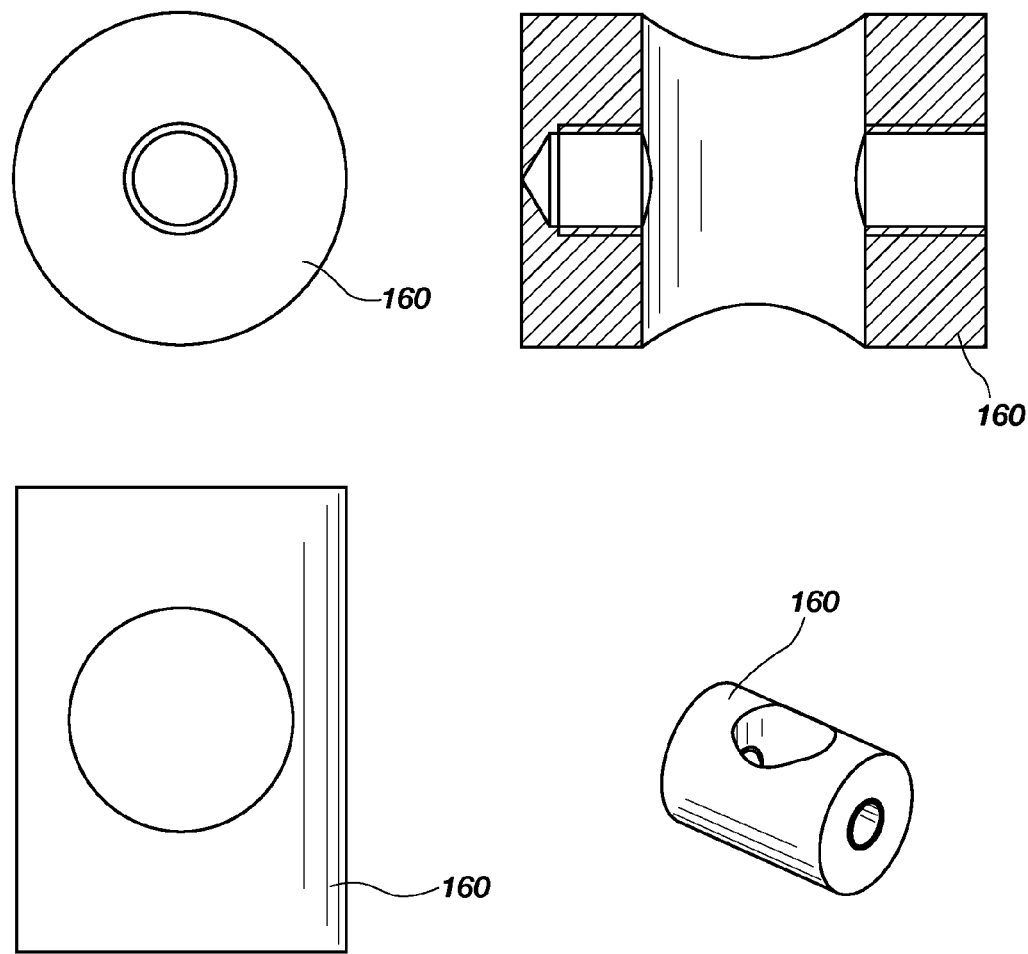
FIG. 9 illustrates an embodiment of a solid axle quick release mechanism and its components consistent with the disclosure herein.

FIG. 9 illustrates an embodiment of a barrel nut 150 for use with a quick release mechanism 100.

Referring to FIGS. 5-9, the quick release mechanism 100 of the disclosure may be used with a threaded solid axle, similar to the enclosed quick release mechanism 1000 described below. The exposed cam quick release mechanism 100 may comprise a housing, a cam insert, a barrel nut 160, and a lever 110.

The second end may include a hole for purposes of making the lever 110 lightweight. The first end of the lever 110 may comprise a slot that separates the first end of the lever 110 into two members. The two members may each comprise a sidewall that defines an opening that may be substantially transverse to the slot. It will be appreciated that the slot may be sized and shaped to accommodate the barrel nut 160.

It will be appreciated that the lever 110 may be manufactured from any suitably strong and lightweight material, such as a lightweight metal or a metallic alloy material or any other material that is sufficiently strong for the intended purpose. Applicant has found that aluminum is such a suitable material, however, other materials may be used without departing from the scope of the disclosure.

The barrel nut 160 may be configured and dimensioned, including size and shape, to accept and receive the solid threaded axle and to fit within the slot of the lever 110. Accordingly, the barrel nut 160 may comprise an opening that is configured and dimensioned according to the size and shape of the axle. The opening may be defined by a sidewall that may be threaded to correspond with and receive the threaded axle. It will be appreciated that the threaded opening should be a sufficient length to avoid a scenario where the threaded axle bottoms out in the barrel nut 160. It will be appreciated that the barrel nut 160 may be manufactured from any suitably strong material, such as metal or a metallic alloy material or any other material that is sufficiently strong for the intended purpose. Applicant has found that steel is such a suitable material, however, other materials may be used without departing from the scope of the disclosure.

It will be appreciated that members may be rotated about an axis of the axle when the barrel nut 160 is secured to the axle. The axle may be secured to the barrel nut 160 by rotating the lever 110 about the axis of the axle in a clockwise manner, thereby engaging the threads of the axle with the threaded sidewall of the opening. The axle may be released from the barrel nut 160 by rotating the lever 110 about the axis of the axle in a counter-clockwise manner, thereby disengaging the threaded connection.

It will be appreciated that the cam surfaces 130 may have a thickness that is larger than the opposite side to create the cam and resulting cam action. Thus, as the second end of the lever 110 is moved into substantial axial alignment with the axis of the axle, the larger cam surfaces 130 are moved out of contact with the actuating surface of the cam insert, such that the slimmer portion of members are in contact with the actuating surface of the cam insert. When this occurs, the compression force is released allowing the lever 110 to rotate freely about the axis of the axle to either tighten or loosen the quick release mechanism 100.

The cam system may comprise the housing, the cam insert and the cam surfaces 130 of the lever 110. The housing may comprise an upper surface and a lower surface with a hole extending through the upper and lower surface of the housing for allowing passage of the axle there-through. The upper surface may comprise a recessed surface for receiving the cam insert therein. It will be appreciated that the housing may be manufactured from any suitably strong and lightweight material, such as a lightweight metal or a metallic alloy material or any other material that is sufficiently strong for the intended purpose. Applicant has found that steel or aluminum is such a suitable material, however, other materials may be used without departing from the scope of the disclosure.

The cam insert may comprise the actuating surface that engages the cam surfaces 130 of the lever 110. The cam insert may be manufactured from any suitable material sufficient for allowing a cam action to occur. For instance, polymers such as plastic or any other material that is sufficiently durable for the intended purpose may be used without departing from the scope of the disclosure.

Figure 10:
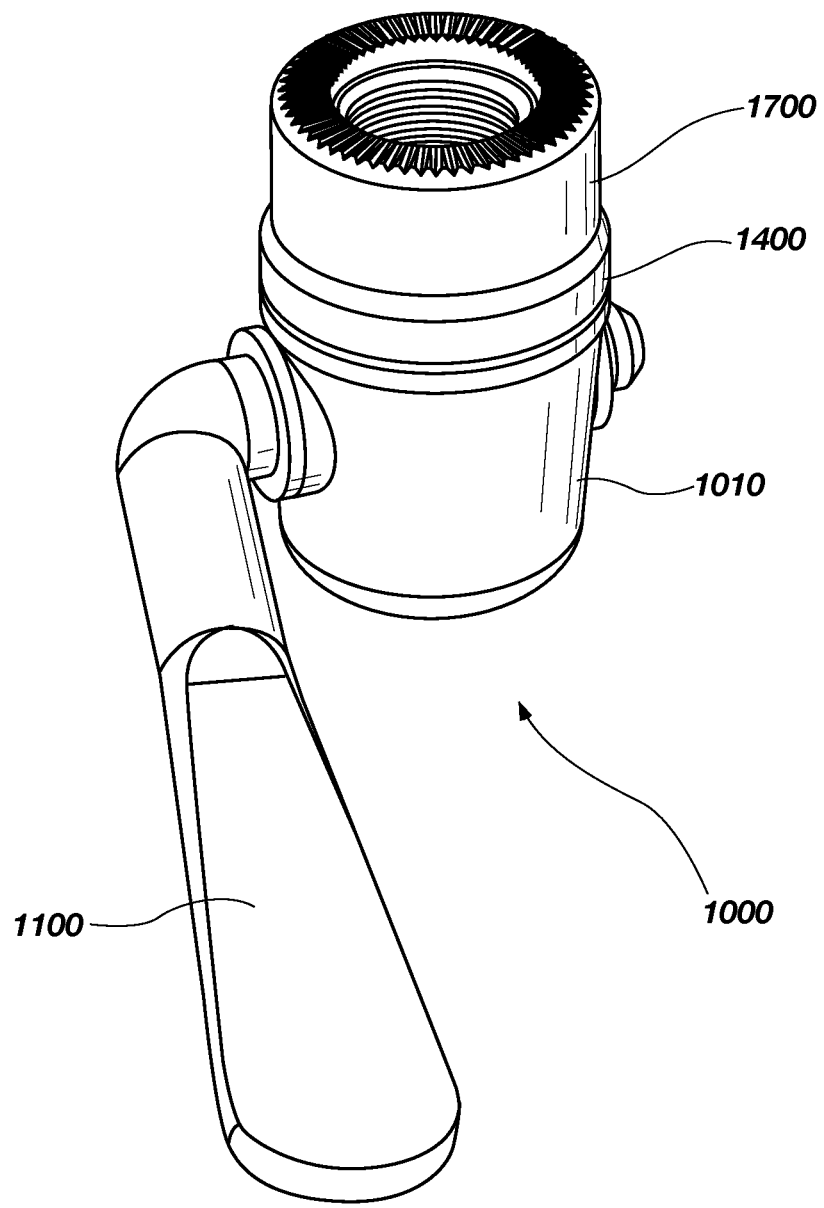
FIG. 10 illustrates an embodiment of a solid axle quick release mechanism and its components consistent with the disclosure herein.

FIG. 10 illustrates an embodiment of a quick release mechanism 1000 for use with a solid axle comprising an internal configuration of working members. The quick release mechanism 1000 may comprise a housing 1010, a spacer 1400, a tubular nut 1500, a cam system illustrated best in FIGS. 13-14, a lever 1100 and may have a pin or C-clip. The quick release mechanism 1000 may be part of a system comprising a bicycle frame, a unicycle frame or other frame, a wheel, a solid threaded axle, and the quick release mechanism 1100 disclosed herein for securing the wheel to the frame.

The housing 1010 may comprise an outer lip defining an opening into a recess within the housing. The recess may be configured, sized and shaped to receive the tubular nut 1500 thereinto in a moveable fit, such as the cam 1200 is actuated the tubular nut 1500 can move relative to the housing. A plurality of locking protrusions 1775 or serrations may be formed around the circumference of the outer lip. The housing may also comprise an opening for receiving therein the lever 1100 and cam system for locking the tubular nut 1500 as described below more fully.

A spacer 1400 may comprise a top portion and a bottom portion with a hollow opening forming a cylindrical shaped channel formed through an axis, of the spacer 1400 between the top portion and bottom portion. The spacer 1400 may be used in situations where the amount of exposed solid axle, i.e., the portion of the axle that attaches to the quick release mechanism 1000, is greater than about ⅝ inches in length, for example about 1 inch in length, thereby effectively extending the quick release mechanism 1000. In other words, when there is exposed axle that is more than about ⅝ inches long, the spacer 1400 may be used to take up the extra space between the frame of the bicycle and the tubular nut 1500 and housing, such that the tubular nut 1500 may be attached to the axle to cinch the bicycle frame and the tubular nut 1500 when the cam system is implemented. If more than about ⅝ inch of axle is exposed, then the spacer 1400 may be implemented to take up the extra space. Thus, it will be appreciated that various spacer 1400 sizes, shapes and lengths may be utilized depending upon the amount of axle exposed. Further, it will be appreciated that the spacer 1400 may or may not be present in a particular embodiment and the presence or absence of a spacer 1400 is within the scope of the disclosure.

It will be appreciated that a sidewall, forming the channel of the spacer 1400, may be smooth without any threads or may comprise threads. In typical applications, where the solid axle is threaded, the sidewall may be smooth and will not comprise threads, to thereby allow the threaded axle to move freely within the channel of the spacer 1400 without engaging any threads. The freedom of movement of the axle within the channel allows the spacer 1400 to move toward the frame of the bicycle when the lever and the cam system are in a closed or locked position creating compression stress or force to secure the connection. Conversely, when the lever 1100 and the cam system are in an open or unlocked position, the freedom of movement of the axle within the channel allows the spacer 1400 to move away from the frame of the bicycle to release the compressive force.

The bottom portion of the spacer 1400 may comprise a bottom surface surrounding the opening of the channel having a plurality of locking protrusions 1775 or serrations that correspond with the locking protrusions 1775 or serrations of the outer lip of the housing 1010 to cause a mating engagement and creating a locking fit. It will be appreciated that the top portion of the spacer 1400 may also comprise a top surface surrounding the opening of the channel having a plurality of serrations.

Figure 11:
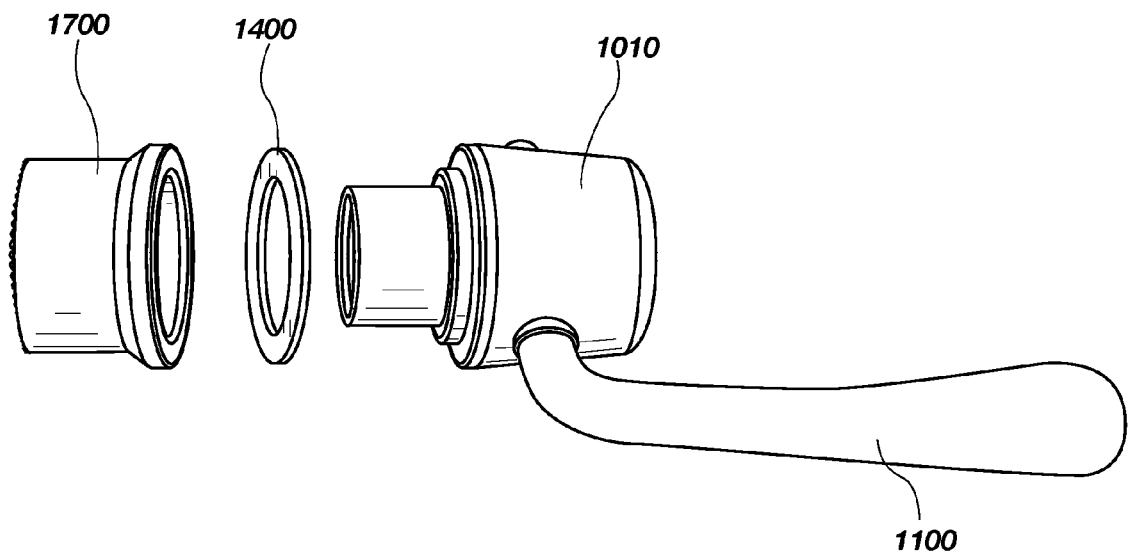
FIG. 11 illustrates an embodiment of a solid axle quick release mechanism and its components consistent with the disclosure herein.

Illustrated in FIG. 11 is a quick release mechanism 1000 for a solid axle in exploded view. As can be seen in the illustration a spacer 1400 may be employed for varying the number of rotations of the mechanism 1000 on to a solid axle.

Figure 12:
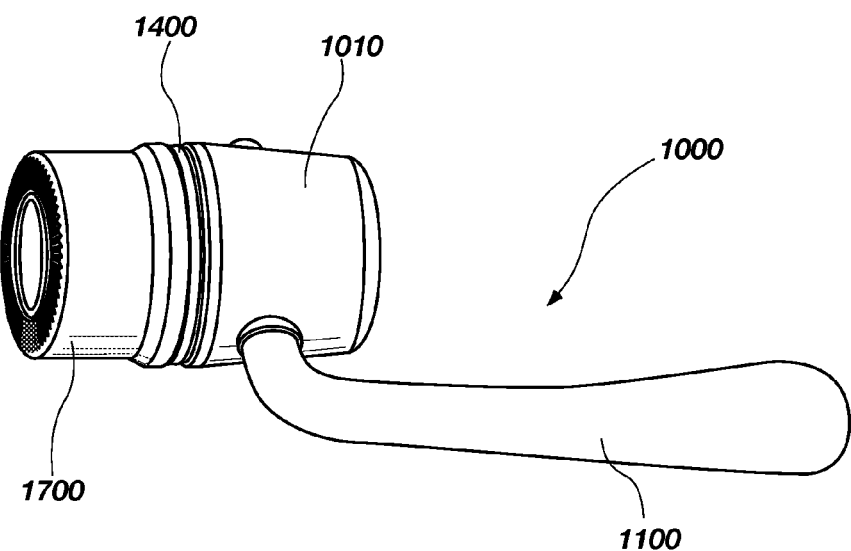
FIG. 12 illustrates an embodiment of a solid axle quick release mechanism and its components consistent with the disclosure herein.

Illustrated in FIG. 12 is a quick release 1000 assembled comprising an optional spacer 1400 therein for varying the number of rotations of the mechanism 1000 on to an axle.

Figure 13:
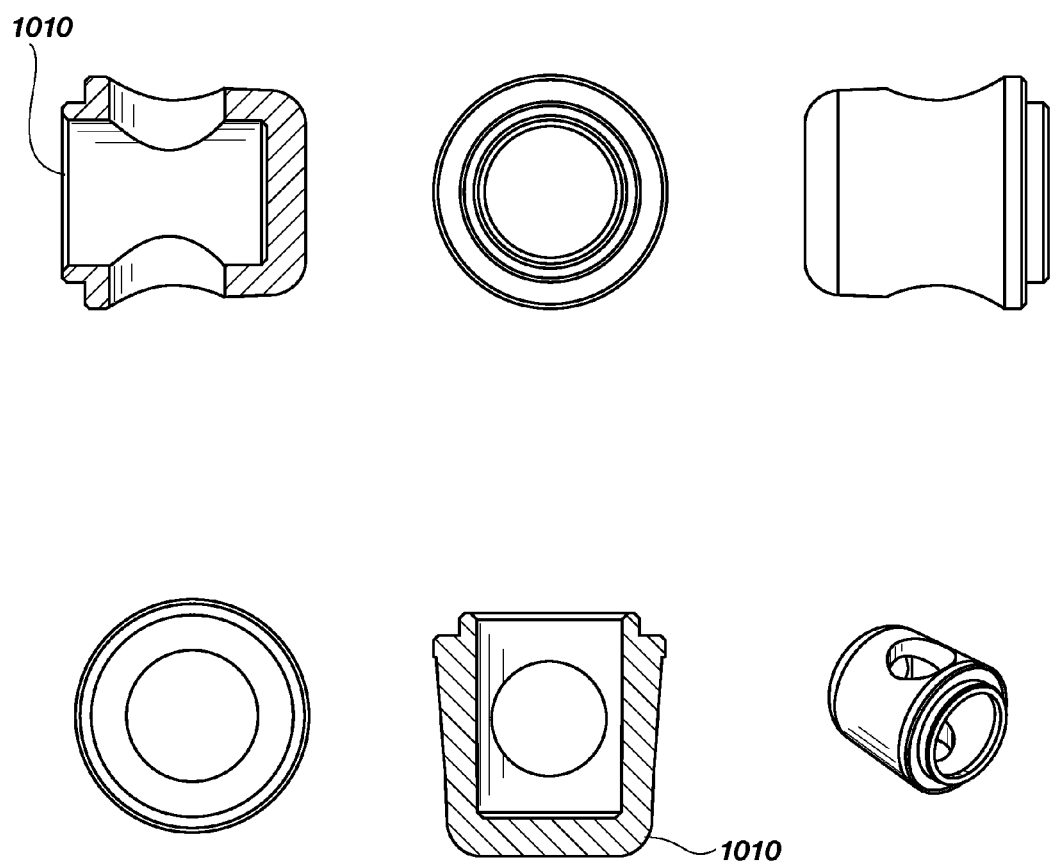
FIG. 13 illustrates an embodiment of a solid axle quick release mechanism and its components consistent with the disclosure herein.

Illustrated in FIG. 13 is an embodiment of housing 1010 as described above for use with a quick release 1000 for a solid axle.

Figure 14:
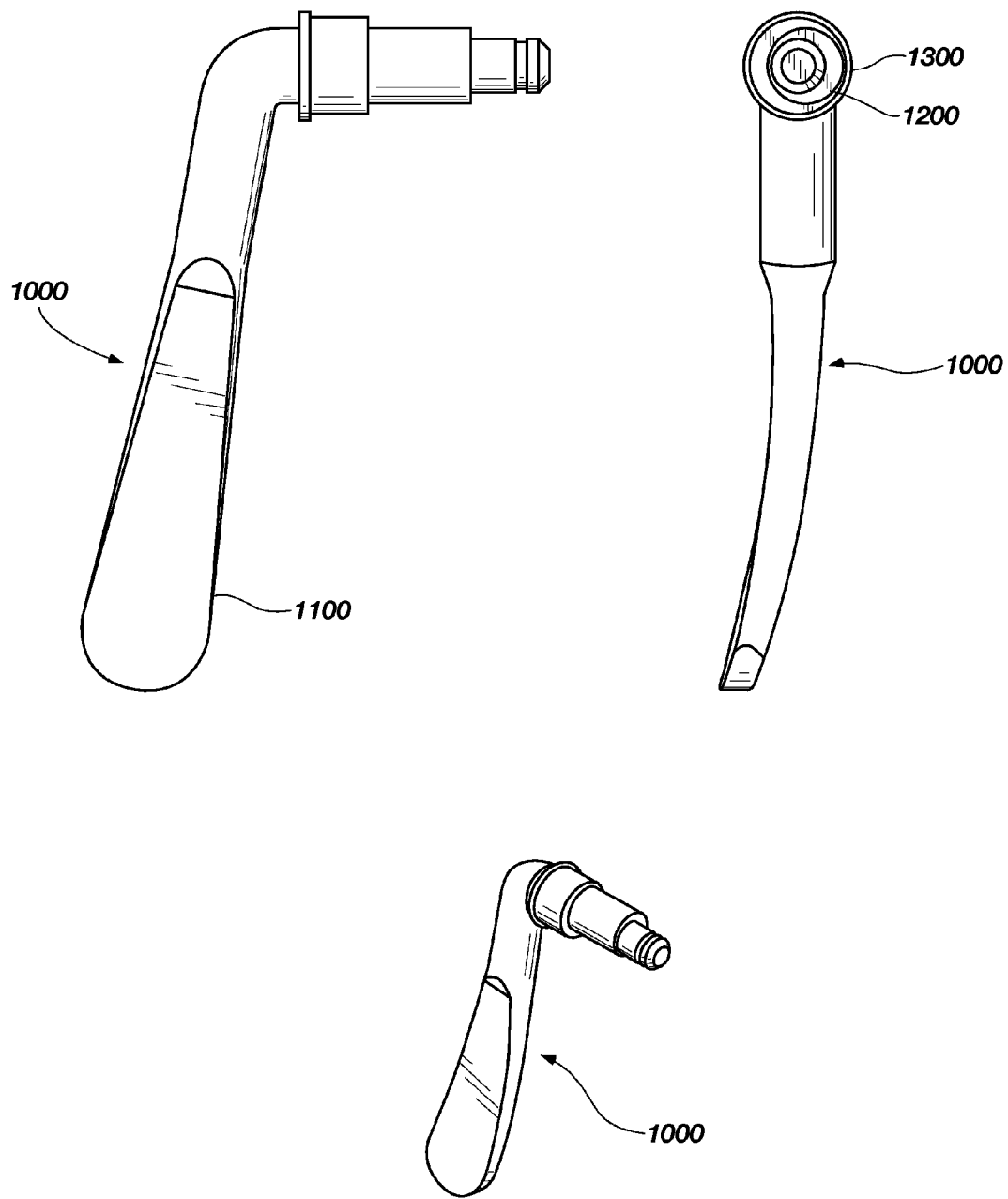
FIG. 14 illustrates an embodiment of a solid axle quick release mechanism and its components consistent with the disclosure herein.

Illustrated in FIG. 14 is an embodiment of a lever 1100 for use with a quick release mechanism 1000 for a solid axle. As can be seen in the illustration, the lever 1100 comprises a cam surface for transferring forces applied to the lever 1100 to a solid axle of a frame, such as a bicycle or unicycle frame.

Figure 15:
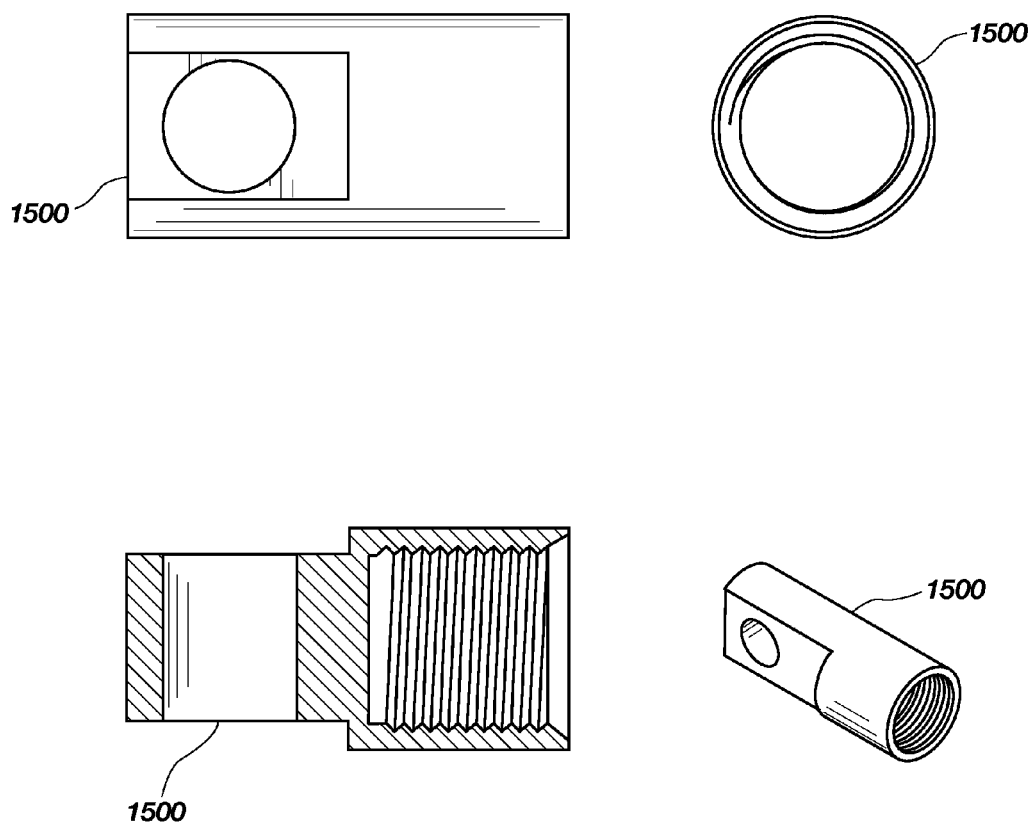
FIG. 15 illustrates an embodiment of a solid axle quick release mechanism and its components consistent with the disclosure herein.

Referring to FIG. 15, a tubular nut 1500 will be discussed. The tubular nut 1500 may comprise a tubular opening or groove defined by a sidewall for receiving thereinto a cam surface or portion of the cam system. In other words, the sidewall a may act as an actuating surface in the cam system, such that when the lever is rotated or moved the cam surface or portion contacts the actuating surface or sidewall causing the tubular nut 1500 to be cinched toward the bicycle frame to lock the wheel to said frame. The tubular nut 1500 may also comprise a recess defined by a sidewall for receiving the solid axle therein. The diameter of the recess may correspond directly with the diameter of the axle and may typically be about ⅜ inch. Accordingly, as the diameter of the axle changes, so should the diameter of the recess. The thickness of the portion surrounding the recess in the tubular nut 1500 should be configured to provide adequate strength when forces acting upon the tubular nut 1500 are encountered.

It will be appreciated that when the tubular nut 1500 is in use, the axis of the tubular nut 1500 may be substantially aligned with an axis of the solid, threaded axle, such that the recess may receive the solid, threaded axle therein. The sidewall may be threaded to correspond with the threads of the solid axle and to secure the tubular nut 1500 to said axle. It will be appreciated that the tubular nut 1500 must be of a sufficient length to accommodate both the tubular opening and the recess. It will be appreciated that the average length of exposed axle that is received into the recess is about ⅝ inch, and as such the depth of the recess may be at least about 1 centimeter and may be about 2.5 centimeters in depth to accommodate the exposed axle. Thus, it will be appreciated that the tubular nut 1500 may eliminate the need for a traditional skewer used in a standard exposed or enclosed quick release mechanism 1000. The tubular nut 1500 may be described in some circumstances as a vertically oriented tubular nut, but it should be noted that when installed in the quick release mechanism 1000 and threaded onto the axle of the bicycle, it will be oriented in a horizontal position with the threaded recess or opening in the bottom of the tubular nut 1500 being aligned with the axle and proximal to the frame, such as a bicycle or unicycle frame.

The tubular nut 1500 may be configured to be secured into the recess of the housing 1010 and may be configured to be moveable with respect to the housing 1010 due to the interaction of the cam portion or surface 1300 and the actuating surface. A cam system may comprise the cam portion or surface 1300 and the actuating surface. The cam system may also comprise the lever 1100 which is configured to rotate the cam portion or surface 1300. The lever 1100 may be attached to the cam portion 1300. A protruding portion and end piece may extend from the cam portion 1300 and may be configured, sized and shaped to extend through tubular opening. Extending between protruding portion and end piece may be recessed area for receiving therein a C-clip or other structural component configured for securing or maintaining the cam portion within the tubular opening. The C-clip may allow the rotation of the cam portion 1300 while maintaining or securing the same in the tubular opening.

Figure 16:
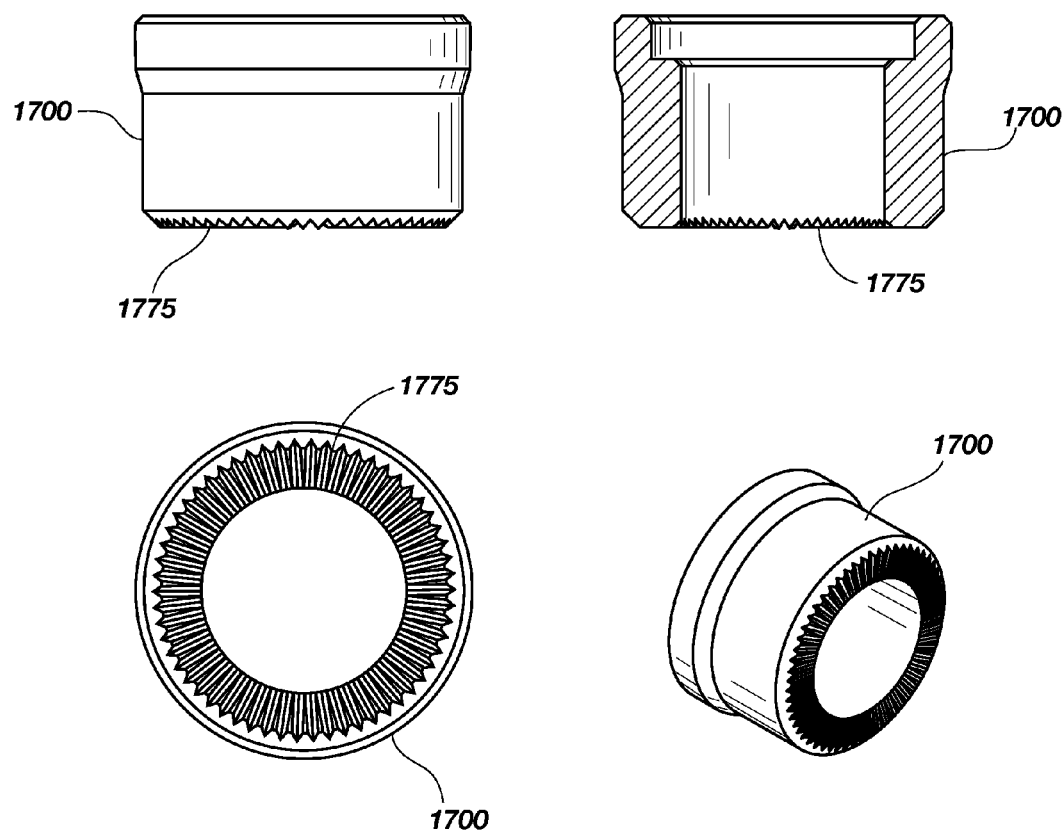
FIG. 16 illustrates an embodiment of a solid axle quick release mechanism and its components consistent with the disclosure herein.

Illustrated in FIG. 16 is a transfer member 1700 that may be used in conjunction with a spacer 1400 for use with an internal cam quick release 1000 for a solid axle. As discussed above, additional incremental spacers 1400 may be used therein to adjust the mechanism 1000. FIG. 16 illustrates an embodiment of a transfer member 1700 that may be configured for transferring a retaining force from a force applied at a lever to the frame or fork of a frame, such as a bicycle or unicycle frame bicycle. The transfer member 1700 may provide for the effective use of spacers 1400 in the axle assembly. The transfer member 1700 may comprise locking protrusions 1775 for making a secure mechanical connection between the axle assembly and the frame or fork of a bicycle. The transfer member 1700 provides the ability to use less complex spacers 1400 while retaining the feature of locking structures.

Figure 17:
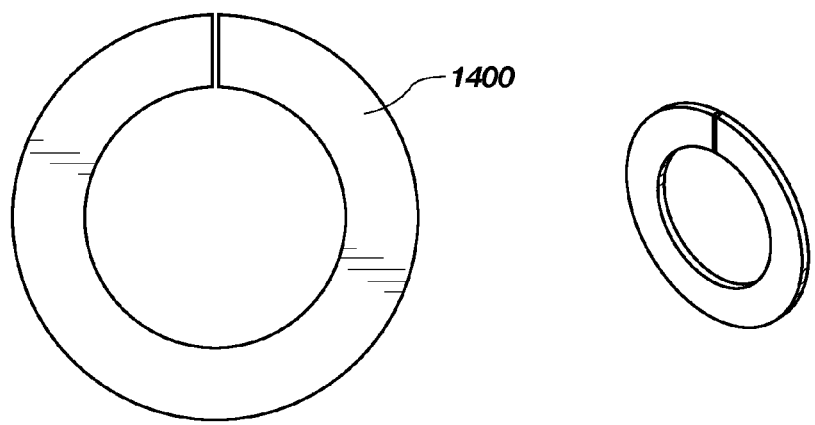
FIG. 17 illustrates an embodiment of a solid axle quick release mechanism and its components consistent with the disclosure herein.

Illustrated in FIG. 17 is a split ring retainer for use in a solid axle quick release mechanism 1000.

Figure 18:
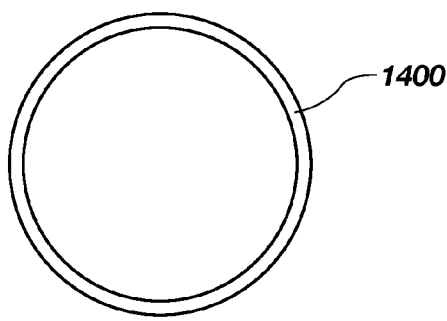
FIG. 18 illustrates an embodiment of a solid axle quick release mechanism and its components consistent with the disclosure herein.
Figure 18:
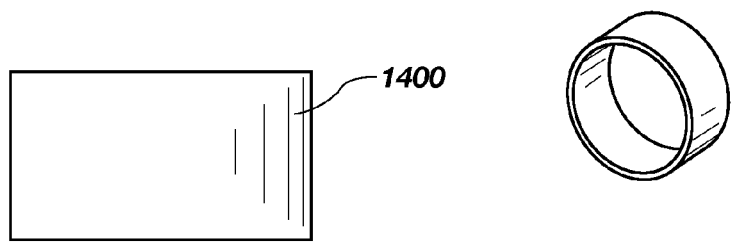
Figure 19:
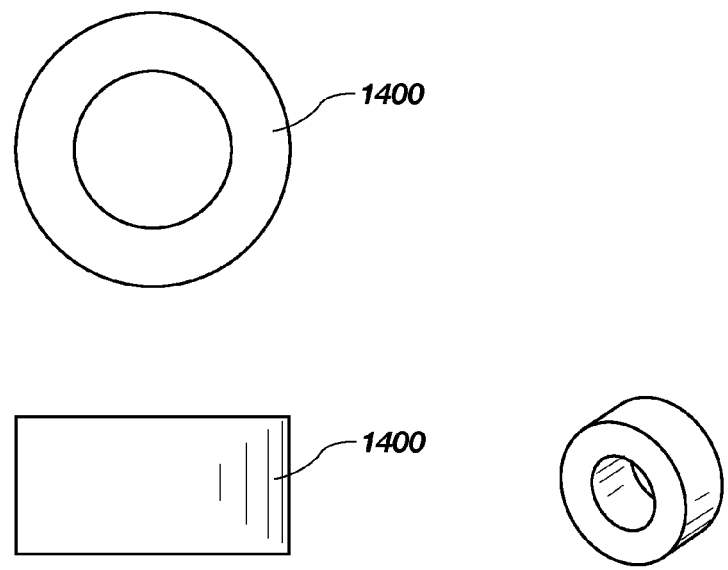
FIG. 19 illustrates an embodiment of a solid axle quick release mechanism and its components consistent with the disclosure herein.

Illustrated in FIGS. 18 and 19 are wear rings or spacers 1400 for use in a solid axle quick release mechanism 1000. An embodiment may include a plurality spacers 1400 in a stackable configuration.

In operation, as the user rotates the quick release by hand in a clockwise manner, the axle of the bicycle is threaded into the threaded recess of the tubular nut. Once the quick release is threaded into the recess sufficiently, the user can then flip the quick release lever over degrees from where it originated to move the cam portion and cinch or lock the tubular nut. In other words, because of the shape of the cam portion, when the lever approaches the 90 degree point in its total 180 degree rotation, the tubular nut may be pushed up into the recess of the housing (or the housing is pulled down). When that occurs, the housing creates pressure against the frame, which then is clamped against the hub of the wheel creating a tight connection. As the lever moves or rotates from 90 degrees to 180 degrees, the cam portion passes over the summit of the oblong portion of the cam and pressure decreases slightly allowing the lever to come to rest near the frame. The summit to the oblong shape of the cam is what prevents the quick release from opening during use. In releasing the quick release, the cam will have to pass back over the summit of the oblong hinge axis and then be unscrewed using the lever of the quick release as a handle.

Referring now to FIGS. 20-23, an embodiment of an exposed cam quick release mechanism 2000 and its components are illustrated. The quick release mechanism 2000 of the disclosure may be used with a threaded solid axle 2200, similar to the enclosed quick release mechanism described above. The exposed cam quick release mechanism 2000 may comprise a housing 2010, a cam insert 2020, a barrel nut 2030, and a lever 2040.

Figure 21A:
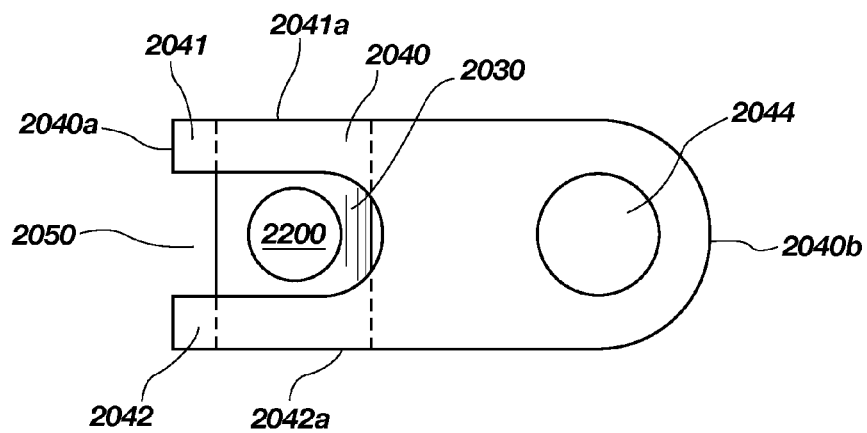
FIG. 21*a* illustrates an embodiment of a solid axle quick release mechanism and its components consistent with the disclosure herein.
Figure 21B:
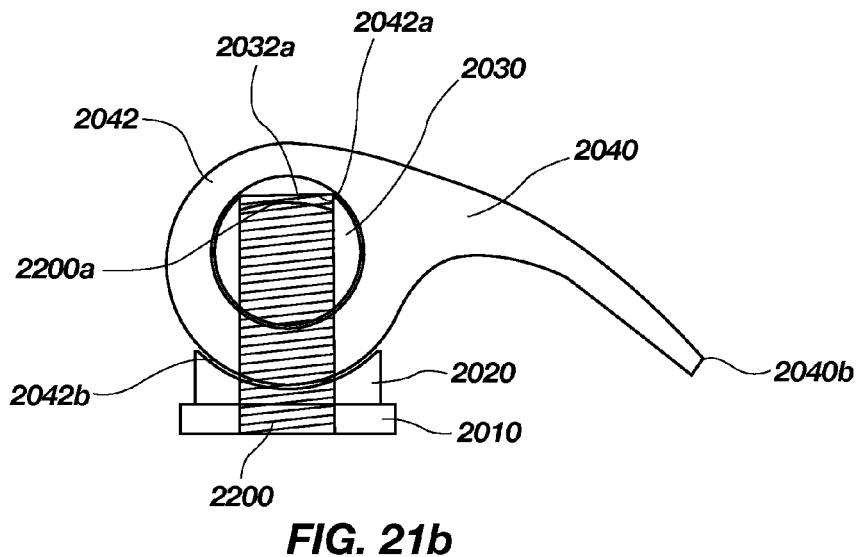
FIG. 21*b* illustrates an embodiment of a solid axle quick release mechanism and its components consistent with the disclosure herein.
Figure 21C:
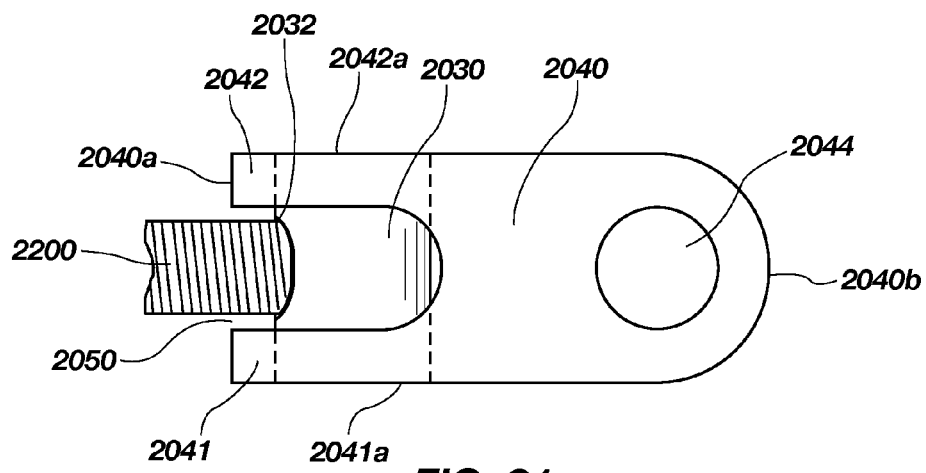
FIG. 21*c* illustrates an embodiment of a solid axle quick release mechanism and its components consistent with the disclosure herein.
Figure 22A:
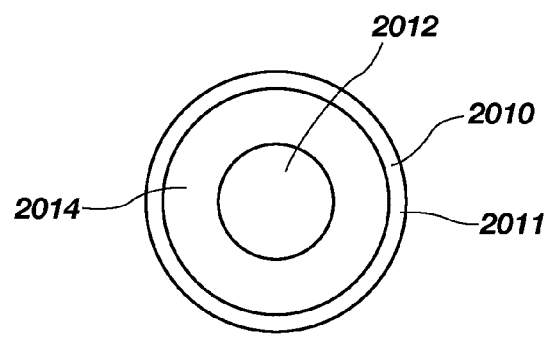
FIG. 22*a* illustrates an embodiment of a solid axle quick release mechanism and its components consistent with the disclosure herein.
Figure 22B:
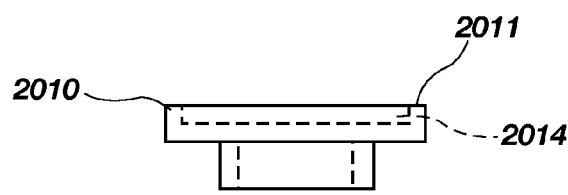
FIG. 22*b* illustrates an embodiment of a solid axle quick release mechanism and its components consistent with the disclosure herein.
Figure 22C:
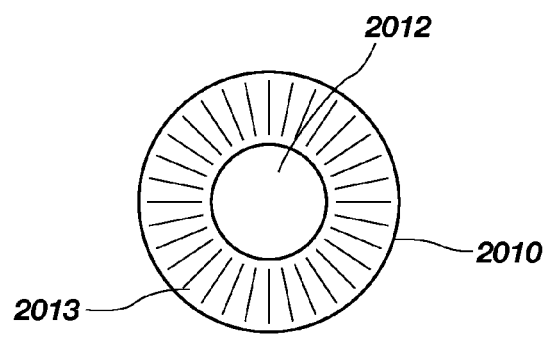
FIG. 22*c* illustrates an embodiment of a solid axle quick release mechanism and its components consistent with the disclosure herein.
Figure 23:
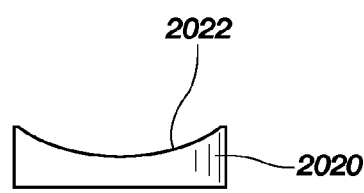
FIG. 23 illustrates an embodiment of a solid axle quick release mechanism and its components consistent with the disclosure herein.

Referring to FIGS. 21a-21c, the lever 2040 may comprise a first end 2040a and a second end 2040b. The second end 2040b may include a hole 2044 for purposes of making the lever 2040 lightweight. The first end 1040a of the lever 2040 may comprise a slot 2050 that separates the first end 2040a of the lever 2040 into two members 2041 and 2042. The two members 2041 and 2042 may each comprise a sidewall that defines an opening 2041a and 2042a that may be substantially transverse to the slot 2050 (illustrated best in FIG. 21b). It will be appreciated that the slot 2050 may be sized and shaped to accommodate the barrel nut 2030.

It will be appreciated that the lever 2040 may be manufactured from any suitably strong and lightweight material, such as a lightweight metal or a metallic alloy material or any other material that is sufficiently strong for the intended purpose. Applicant has found that aluminum is such a suitable material, however, other materials may be used without departing from the scope of the disclosure.

The barrel nut 2030 may be configured and dimensioned, including size and shape, to accept and receive the solid threaded axle 2200 and to fit within the slot 2050 of the lever 2040. Accordingly, the barrel nut 2030 may comprise an opening 2032 that is configured and dimensioned according to the size and shape of the axle 2200. The opening 2032 may be defined by a sidewall 2032a that may be threaded to correspond with and receive the threaded axle 2200. It will be appreciated that the threaded opening 2032 should be a sufficient length to avoid a scenario where the threaded axle 2200 bottoms out in the barrel nut 2030. Thus, for example, FIG. 21b illustrates a top portion 2200a of the threaded axle 2200 that does not extend past the threads of the opening 2032. It will be appreciated that the barrel nut 2030 may be manufactured from any suitably strong material, such as metal or a metallic alloy material or any other material that is sufficiently strong for the intended purpose. Applicant has found that steel is such a suitable material, however, other materials may be used without departing from the scope of the disclosure.

It will be appreciated that members 2041 and 2042 may be rotated about an axis of the axle 2200 when the barrel nut 2030 is secured to the axle 2200. The axle 2200 may be secured to the barrel nut 2030 by rotating the lever 1040 about the axis of the axle 2200 in a clockwise manner, thereby engaging the threads of the axle with the threaded sidewall 2032a of the opening 2032. The axle 2200 may be released from the barrel nut 2030 by rotating the lever 2040 about the axis of the axle 2200 in a counter-clockwise manner, thereby disengaging the threaded connection.

Figure 20:
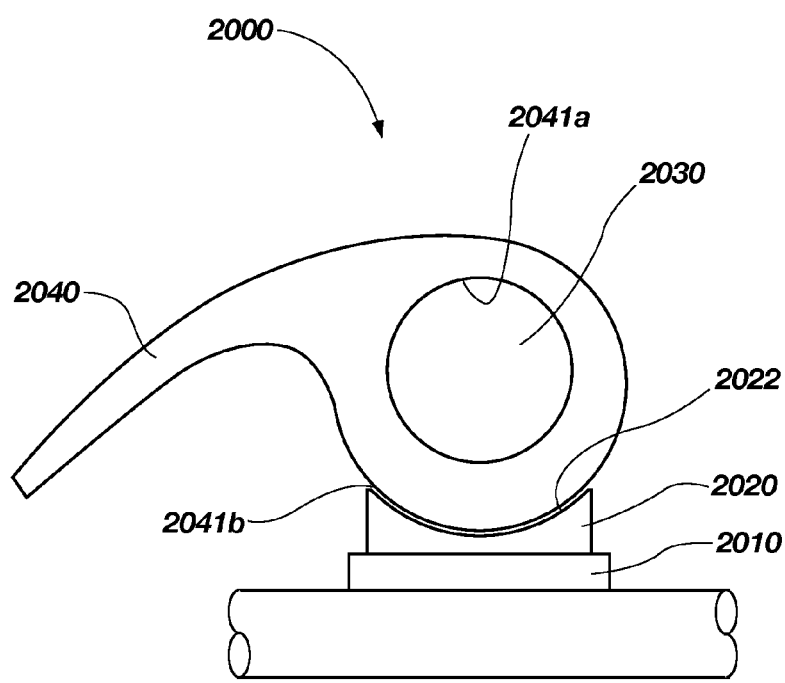
FIG. 20 illustrates an embodiment of a solid axle quick release mechanism and its components consistent with the disclosure herein.

Referring specifically to FIGS. 20 and 21b, members 2041 and 2042 of the lever 2040 may comprise a cam surface 2041b and 2042b that is configured and dimensioned to actuate and engage a corresponding actuating surface 2022 of the cam insert 2020. It will be appreciated that the cam surfaces 2041b and 2042b may have a thickness that is larger than the opposite side (of members 2041 and 2042) to create the cam and resulting cam action. Thus, as the second end 2040b of the lever 2040 is moved into substantial axial alignment with the axis of the axle 2200, the larger cam surfaces 2041b and 2042b are moved out of contact with the actuating surface 2022 of the cam insert 2020, such that the slimmer portion of members 2041 and 2042 are in contact with the actuating surface 2022 of the cam insert 2020. When this occurs, the compression force is released allowing the lever 2040 to rotate freely about the axis of the axle 2200 to either tighten or loosen the quick release mechanism.

Referring now to additional components of the cam system as illustrated in FIGS. 21b, 22a-23, the cam system may comprise the housing 2010, the cam insert 2020 and the cam surfaces 2041b and 2042b of the lever 2040. The housing 2010 may comprise an upper surface 2011 and a lower surface 2013 with a hole 2012 extending through the upper and lower surfaces 2011 and 2013 of the housing 2010 for allowing passage of the axle 2200 (illustrated best in FIG. 22a) there-through. The upper surface 2011 may comprise a recessed surface 2014 for receiving the cam insert 2020 therein. It will be appreciated that the housing 2010 may be manufactured from any suitably strong and lightweight material, such as a lightweight metal or a metallic alloy material or any other material that is sufficiently strong for the intended purpose. Applicant has found that steel or aluminum is such a suitable material, however, other materials may be used without departing from the scope of the disclosure.

The cam insert 2020 may comprise the actuating surface 2022 that engages the cam surfaces 2041b and 2042b of the lever 2040. The actuating surface 2022 may be concave or have a concave profile as illustrated best in FIG. 23. The cam insert 2020 may be manufactured from any suitable material sufficient for allowing a cam action to occur. For instance, polymers such as plastic or any other material that is sufficiently durable for the intended purpose may be used without departing from the scope of the disclosure.

An embodiment may comprise the components of a quick release mechanism and further comprise an adjusting structure or component for controlling the placement of the mechanism on the axle and thereby controlling the placement of the lever during use.

An embodiment may comprise a plurality of adjusting components.

An embodiment may comprise a plurality of tubular nuts that are interchangeable for accommodating various axle configurations and sizes.

An embodiment may comprise a kit having a quick release mechanism for a solid axle and a set of adjusting components for use with a frame, such as a bicycle or unicycle frame.

It will be appreciated that the above quick release mechanisms and other components disclosed herein may be utilized in connection with any application where a solid axle is used. Thus, the disclosure may be used in connection with a wheel and vehicle frame, or it may be used in connection with any other solid axle application in which there is a minimal amount of threaded axle on which to attach.

It will be appreciated that there are many features and advantages provided by the disclosure. For example, it is a potential feature of the disclosure to eliminate the skewer from a quick release mechanism used in connection with a vehicle, such as a bicycle, wheelchair, motorcycle, unicycle or other similar modes of transportation. It is a potential feature of the disclosure to provide a quick release mechanism that operates with a solid axle and without a hollow hub/skewer system. It is another potential feature of the disclosure to provide a quick release mechanism that operates with a solid axle that can move laterally side to side. It is another potential feature to provide a quick release mechanism that can be used with a solid axle having a diameter that typically ranges between about ¼" to about ½" (typically ⅜") instead of the much smaller diameter of a skewer that is as small as ⅛". It is another potential feature of the disclosure to provide a quick release mechanism that is capable of securing a wheel to a frame using a solid axle where the connection point of the quick release is about quadruple in size of a typical skewer quick release mechanism. It is yet another potential feature to provide a quick release mechanism that is attachable to a solid axle having an exposed length that is greater than about ½", or an average length of exposed threaded axle of about ⅝" or greater.

In the foregoing Detailed Description, various features of the disclosure are grouped together in a single embodiment for the purpose of streamlining the disclosure. This method of disclosure is not to be interpreted as reflecting an intention that the disclosure requires more features than are expressly recited in each embodiment. Rather, inventive aspects lie in less than all features of a single foregoing disclosed embodiment.

It is to be understood that the above-described arrangements are only illustrative of the application of the principles of the disclosure. Numerous modifications and alternative arrangements may be devised by those skilled in the art without departing from the spirit and scope of the disclosure and the appended claims are intended to cover such modifications and arrangements. Thus, while the disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A releasable axle assembly comprising:
    a quick release configured to be attached to an axle that is solid throughout its length and is a load bearing member, wherein the solid axle has a first threaded portion and a second threaded portion thereon at opposing ends of the solid axle, wherein the solid axle is fixed in position in relation to horizontal movement about an axis of a hub and wherein the quick release comprises:
    a tubular nut having a threaded portion at a first end corresponding to said first threaded portion of said solid axle;
    a lever for moving a cam such that said quick release is moved relative to said solid axle along a path substantially parallel and co-axial with said solid axle;
    a transfer member positioned between the cam and a frame or fork to transfer a retaining force from the lever to the frame or fork, wherein the transfer member comprises an opening sized to allow the first end of the tubular nut to pass through the transfer member;
    wherein the tubular nut attaches the quick release to the solid axle;
    wherein said quick release is attachable to the solid axle, wherein a diameter of said first threaded portion of said solid axle and said second threaded portion of said solid axle is greater than 0.125 inches.

2. The releasable axle assembly of claim 1, wherein said cam is an externally exposed cam.

3. The releasable axle assembly of claim 1, wherein said cam is inside of a housing such that operation of said cam causes said housing to move relative to said axle.

4. The releasable axle assembly of claim 1, wherein the tubular nut further comprises a relieved portion for accommodating a portion of said lever such that the overall size of said quick release may be reduced.

5. The releasable axle assembly of claim 4, further comprising an interchangeable tubular nut for fitment to varying axle configurations.

6. The releasable axle assembly of claim 1, wherein the transfer member comprises locking protrusions thereon.

7. The releasable axle assembly of claim 6, further comprising a spacer disposed between said transfer member and remaining quick release components thereby providing variable positioning and tensioning of said lever.

8. The releasable axle assembly of claim 7, wherein said spacer is configured to provide 90 degree rotational positioning.

9. The releasable axle assembly of claim 6, further comprising a plurality of spacers having a differing thicknesses that are configured for providing variable positioning and tensioning of said lever at 90 degree increments.

10. The releasable axle assembly of claim 6, further comprising a plurality of spacers each providing 90 degrees of rotational lever placement such that stacking said spacers provides a plurality of lever positions.

11. A vehicle having at least one wheel comprising:
a wheel comprising a hub;
a frame;
a releasable axle assembly having:
 a pair of quick releases per wheel;
 an axle having a first threaded portion and a second threaded portion thereon at opposing ends of said axle;
 wherein said axle is load bearing and solid throughout its length;
 wherein the pair of quick releases comprises a first quick release and a second quick release for use with said solid axle;
 wherein a threaded portion at a first end of said first quick release corresponds with said first threaded portion of said solid axle;
 wherein a threaded portion of said second quick release corresponds with said second threaded portion of said solid axle;
 a lever on each of said first quick release and said second quick release for moving a cam on each of said first quick release and said second quick release such that said first quick release and said second quick release are moved relative to said solid axle along a path substantially parallel and co-axial with said solid axle;
 a transfer member positioned between the cam and the frame to transfer a retaining force from the lever to the frame, wherein the transfer member comprises an opening sized to allow the first end of the tubular nut to pass through the transfer member;
wherein the quick release assembly is configured to be attached to the solid axle, which is fixed in position in relation to horizontal movement about an axis of the hub of the wheel; and
wherein said solid axle has a diameter of said first threaded portion and said second threaded portion greater than 0.125 inches.

12. The vehicle of claim 11, wherein said cam is an externally exposed cam.

13. The vehicle of claim 11, wherein said cam is inside of a housing such that operation of said cam causes said housing to move relative to said axle.

14. The vehicle of claim 11, further comprising a tubular nut having a relieved portion for accommodating a portion of said lever such that the overall size of said quick release may be reduced.

15. The vehicle of claim 11, wherein the transfer member comprises locking protrusions thereon.

16. The vehicle of claim 15, further comprising a spacer disposed between said transfer member and remaining quick release components thereby providing variable positioning and tensioning of said lever.

17. The vehicle of claim 16, wherein said spacer is configured to provide 90 degree rotational positioning.

18. The vehicle of claim 15, further comprising a plurality of spacers having differing thicknesses that are configured for providing variable positioning and tensioning of said lever at 90 degree increments.

19. The vehicle of claim 15, further comprising a plurality of spacers each providing 90 degrees of rotational lever placement such that stacking said spacers provides a plurality of lever positions.

20. The vehicle of claim 11, wherein the vehicle comprises four quick releases.

21. A fastener comprising:
a quick release configured to be attached to an axle that is solid throughout its length and is a load bearing member, wherein the solid axle has a first threaded portion and a second threaded portion thereon at opposing ends of the solid axle, wherein said solid axle is fixed in position in relation to horizontal movement about an axis of a hub and wherein the quick release comprises:
 a tubular nut having a threaded portion corresponding to said first threaded portion of said solid axle;
 a lever for moving a cam such that said quick release is moved relative to said solid axle along a path substantially parallel and co-axial with said solid axle; and
 a transfer member positioned between the cam and a frame or fork to transfer a retaining force from the lever to the frame or fork, wherein the transfer member comprises an opening sized to allow a first end of the tubular nut to pass through the transfer member;
wherein the tubular nut attaches the quick release to the solid axle; and
wherein said solid axle has a diameter of said first threaded portion and said second threaded portion greater than 0.125 inches.

22. The fastener of claim 21, wherein said cam is an externally exposed cam.

23. The fastener of claim 21, wherein said cam is inside of a housing such that operation of said cam causes said housing to move relative to said solid axle.

24. The fastener of claim 21, wherein the tubular nut further comprises a relieved portion for accommodating a portion of said lever such that the overall size of said quick release may be reduced.

25. The fastener of claim 21, wherein the transfer member comprises locking protrusions thereon.

26. The fastener of claim 25, further comprising a spacer disposed between said transfer member and remaining quick release components thereby providing variable positioning and tensioning of said lever.

27. The fastener of claim 26, wherein said spacer is configured to provide 90 degree rotational positioning.

28. The fastener of claim 25, further comprising a plurality of spacers having differing thicknesses that are configured for providing variable positioning and tensioning of said lever at 90 degree increments.

29. The fastener of claim 25, further comprising a plurality of spacers each providing 90 degrees of rotational lever placement such that stacking said spacers provides a plurality of lever positions.

* * * * *